M. RATEL.

AUTOMATIC STOKER OF THE UNDERFEED TYPE.

APPLICATION FILED FEB. 17, 1922.

Reissued Sept. 26, 1922. 15,462.

2 SHEETS—SHEET 1.

Inventor

Maurice Ratel

By Munro, Cameron, Davis & Kirkham

Attorneys

M. RATEL.

AUTOMATIC STOKER OF THE UNDERFEED TYPE.

APPLICATION FILED FEB. 17, 1922.

Reissued Sept. 26, 1922. 15,462.

2 SHEETS—SHEET 2.

Inventor

Maurice Ratel

By Mauro, Cameron, Levis & Kerkam

Attorneys

Reissued Sept. 26, 1922. Re. 15,462

UNITED STATES PATENT OFFICE.

MAURICE RATEL, OF NEW YORK, N. Y.

UTOMATIC STOKER OF THE UNDERFEED TYPE.

Original application filed March 30, 1914, Serial No. 828,423. Divided and application filed October 5, 1920, Serial No. 414,836. Original No. 1,389,982, dated September 6, 1921. Application for reissue filed February 17, 1922. Serial No. 537,303.

*To all whom it may concern:*

Be it known that I, MAURICE RATEL, a citizen of the Republic of France, and a resident of New York city, N. Y., have invented a new and useful Improvement in Automatic Stokers of the Underfeed Type, which invention is fully set forth in the following specification.

This invention relates to automatic stokers and, more particularly, to automatic stokers of the underfeed type, and it has for its object to provide an improved device of this character which overcomes the serious defects and disadvantages inherent in automatic underfeed stokers heretofore employed.

It has heretofore been proposed to provide an automatic underfeed stoker comprising a series of alternating fuel retorts or troughs and downwardly-inclined twyers, together with means in each of said retorts for feeding fuel therethrough to the fuel bed. The stokers of this type heretofore suggested, however, have been more or less defective because their fuel supporting surfaces have been steeply inclined, generally at an angle of about 30°, so that the feeding of the fuel and solid products of combustion would be effected to a large extent, if not entirely, by the force of gravity.

In the first place, a stoker of this type requires a relatively large space in a vertical direction and, therefore, is inapplicable to many furnace installations where it is impossible to raise the boilers or lower the boiler-room floor.

In the second place, a stoker of this type provides a bad distribution of fuel and, consequently, an imperfect combustion thereof owing to the unequal supply of air to different parts of the fuel bed. As gravity has been relied upon to effect feeding of the fuel and solid products of combustion, the fuel bed has taken a shape conforming at one side to the fuel-supporting surfaces and at its opposite side to the angle of repose of the fuel and solid products of combustion, which is an angle of 45° or more with ordinary fuels. This difference in the inclination between the fuel supporting surfaces of the stoker and the natural angle of repose of the fuel has therefore resulted in a fuel bed which varies greatly in thickness from top to bottom, being relatively thin opposite the uppermost portion of the twyers, relatively thick opposite the intermediate portion of the twyers and relatively thin opposite the lowermost portion of the twyers. This uneven distribution of the fuel has been accompanied by an equally uneven distribution of the air. The air, tending to follow the lines of least resistance, has passed in excess through the thinner portions of the fuel bed and in insufficient quantities through the thicker portions of the fuel bed. Consequently, this insufficient supply of air at the thicker portions of the fuel bed has resulted in incomplete combustion and the formation of carbon monoxid which escapes without combustion, owing to the inadequate air supply, and with a consequent loss of heat.

In the third place, the ashes and fuel tend to fuse, forming large lumps, which in turn tend to take a steeper angle than the normal angle of repose of the fuel, until, becoming detached, they produce a sudden movement of the fuel and solid products of combustion in the nature of an avalanche, which carries with it both fuel and solid products of combustion onto the dumping sections of the stoker. Here the unburned fuel is smothered in the ashes and slag and is carried into the ash pit and lost.

It has also been proposed to provide an automatic underfeed stoker of the above type with fuel-feeding members at both the top and the bottom of each fuel retort or trough. Devices of this type, however, have not overcome the difficulties arising from the fuel tending to take its natural angle of repose while, on the other hand, the lower fuel-feeding member has pushed much unburned fuel from the retort, where no provision has been made for supplying the same with sufficient air to insure proper combustion, directly onto the dumping sections of the stoker, where it is smothered in the ashes and slag and becomes extinguished and lost. In fact, considerable fuel that has become well ignited while opposite the twyers is pushed onto the dumping sections of the stoker and, becoming smothered in the ashes and slag, also is extinguished and lost. On the other hand, this repeated feeding of incandescent fuel onto the dumping sections of the stoker results in their early destruction by burning them out, It is an object of the present invention to overcome these defects and disadvantages by causing a continuous and regular advancing movement of the fuel and solid products of combustion in the fuel bed and feeding progressively decreasing quantities of fuel to the successive portions from top to bottom of said bed, so as to provide proper distribution of the fuel and air in said bed and maintain the latter of substantially uniform thickness.

Another object of this invention is to provide, in combination with fuel-feeding means of the underfeed type, means at the rear of the fuel retorts or troughs, at the rear of the twyers, or both, whereby the fuel fed from the bottom of the retorts and distributed to the rear of the twyers will be supplied with sufficient air to insure its combustion.

A further object of this invention is to provide in combination with fuel-feeding means of the underfeed type, a receiving grate at the rear of the series of twyers and fuel retorts or troughs which is provided with an air supply decreasing progressively in the direction of the feed of the fuel, whereby unburned fuel reaching said grate may be properly supplied with air to support combustion, and which is also provided, if desired, with means for the injection of moisture at the rear of said grate whereby the solid products of combustion may be effectively cooled before reaching the dumping sections of the stoker and the heat conserved in forming combustible gases.

A further object of this invention is to provide, in combination with fuel-feeding means of the underfeed type, a receiving grate at the rear of the series of twyers and fuel retorts or troughs which comprises a plurality of movable grate bars that act in the nature of a sifter and facilitate a regular advancing movement of the fuel bed.

Another object of this invention is to obviate the difficulties heretofore experienced from the rapid burning of the twyers by so constructing them that they may be effectively cooled.

A further object of the invention is to provide, in combination with an automatic underfeed stoker of the type referred to, means for simultaneously varying the rate at which the fuel and air are supplied thereto.

Other objects relate to the provision of an automatic underfeed stoker which is simple in construction, efficient in operation, inexpensive to maintain, and economical in its use of fuel.

Broadly stated, the invention comprises an automatic underfeed stoker having a series of alternating twyers and fuel retorts or troughs providing an inclined fuel bed whereby the fuel and solid products of combustion are fed downwardly with the aid of gravity, and a plurality of fuel feeding members which as respects one feature of my invention have progressively decreasing capacity, disposed throughout the major portion of the length of each retort, said fuel feeding members being operatively connected with the main power shaft of the stoker, so as to feed progressively smaller or decreasing quantities of fuel to the fuel bed in substantially parallel directions. This progressive decrease in the capacity of the successive fuel-feeding members may be effected by rendering said fuel-feeding members of progressively decreasing stroke, or progressively decreasing size, or both. Said fuel-feeding members preferably afford supports for the fresh fuel, and thereby insure its continuous and progressive distribution to the fuel bed throughout the major portion of the length of each retort and also by their movement, produce an undulatory or wave-like motion in said fuel bed.

The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

Figure 4:
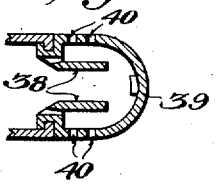
Figure 5:
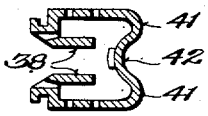
Figure 8:
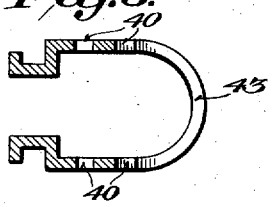
Figure 6:
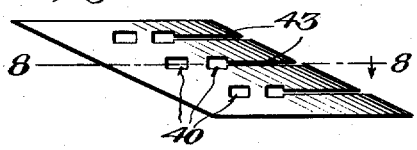
Figure 7:
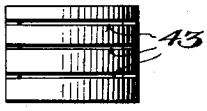
Figure 9:
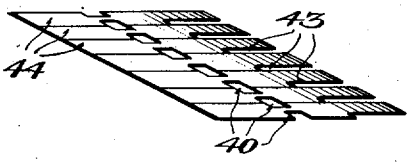
Figure 10:
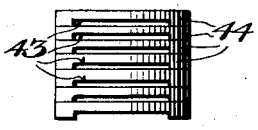

Fig. 4. is an enlarged horizontal section of one construction of twyer which embodies the present invention;

Fig. 5 is an enlarged horizontal section of another construction of twyer which also embodies the present invention;

Fig. 6 is a side view of another construction of twyer which also embodies the present invention;

Fig. 7 is a face view of the twyer of Fig. 6;

Fig. 8 is a horizontal section on the line 8—8 of Fig. 6;

Fig. 9 is a side view of a twyer built up of a plurality of separate bars;

Fig. 10 is a face view of the twyer of Fig. 9; and

Figure 11:
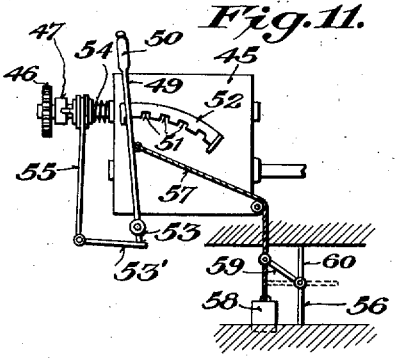
Figure 3:
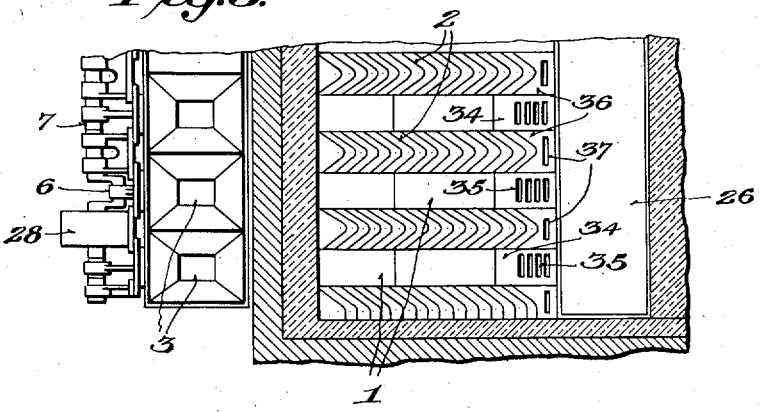
Fig. 3 is a partial plan to illustrate the disposition of apertures at the rear of the twyers and in the bottom of the fuel retorts or troughs, the twyers and retorts being shown diagrammatically, with the main and secondary fuel feeding members, grate bars and dumping plate omitted.

Fig. 11 is a schematic view of means for automatically and simultaneously controlling the speed of the stoker and the admission of air.

The present invention is applicable to a wide variety of boilers and forms of furnaces and, therefore, as it is not limited to any particular type of boiler or furnace construction, the details of the latter have not been illustrated.

Figure 1:
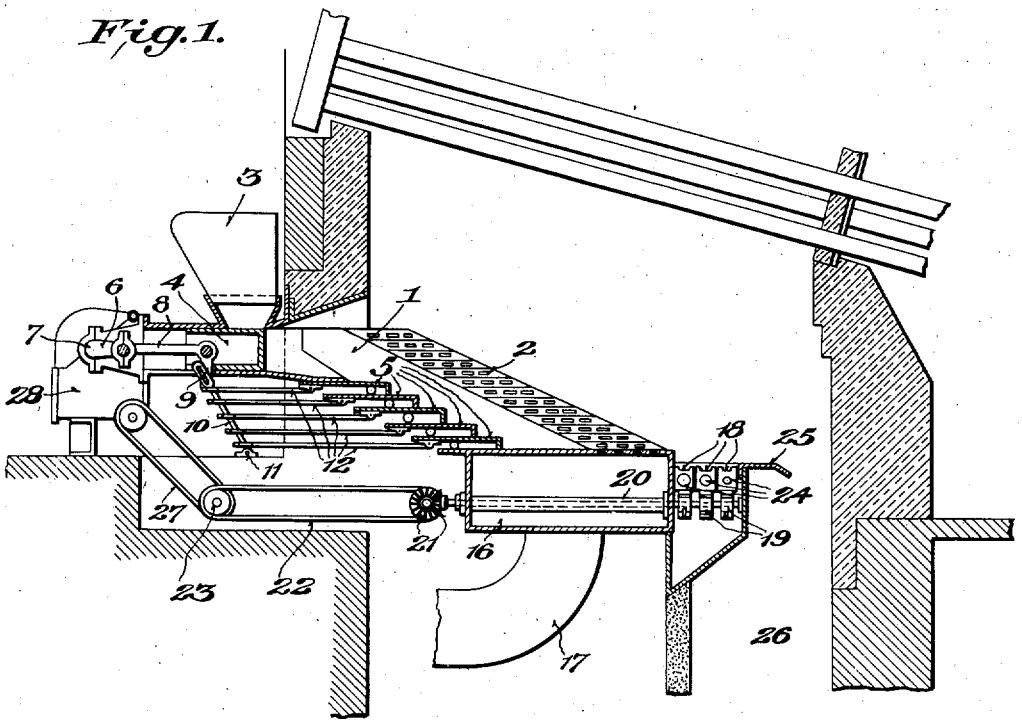
Figure 1 is a longitudinal section through an automatic underfeed stoker embodying the present invention.

In the form shown in Fig. 1, the automatic stoker consists of a series of alternating fuel retorts or troughs 1 and downwardly-inclined twyers 2 of any suitable construction. Said twyers accordingly provide downwardly-inclined fuel-supporting surfaces whereby the advancing movement of the fuel bed is effected with the aid of gravity. The fuel is fed through each retort or trough 1 from a hopper 3 by a plurality of fuel-feeding members which, in conformity with the present invention, are of progressively decreasing capacity and disposed throughout the major portion of the length of said retort. In the form shown in Fig. 1, the fuel-feeding members comprise a main fuel-feeding ram or piston 4 and a plurality of secondary fuel-pushing members 5. The main fuel-feeding member 4 may be reciprocated in any suitable way, as by a crank 6 rotated by a shaft 7. The connecting rod 8 from said crank to the member 4 is shown as a bell crank lever to the depending end 9 of which is pivotally connected a rod 10 having its opposite end pivotally mounted at 11. A plurality of connecting rods 12 are operatively connected to said rod 10 and said connecting rods are in turn operatively connected to the secondary fuel-feeding members 5. As the rod 10 is stationarily pivoted at one end and has a range of movement at its opposite end equal to that of the main fuel-feeding member 4, each of the succeeding secondary fuel-feeding members 5 has a proportionately decreasing range of movement, whereby said members are of successively decreasing capacity and adapted to feed progressively smaller quantities of fuel to the fuel bed. It is to be expressly understood, however, that any other suitable means for effecting a proportionate decrease in the stroke of capacity of the successive fuel-feeding members may be employed, if desired. Any suitable anti-friction means may also be employed to facilitate the movement of said fuel-feeding members.

As the plurality of fuel-feeding members are disposed substantially throughout the length of each fuel retort or trough and have substantially parallel movement in a horizontal direction, they operate to agitate the entire fuel bed, giving the same a waving motion as the reciprocating fuel pushers advance and recede. This agitation, aided by gravity, effects a continuous and uniform settling movement of the fuel down the incline of the fuel bed. This by itself would tend to effect an accumulation of fuel adjacent the bottom of the incline and a diminishing thickness of the fuel toward the top thereof. On the other hand, the fuel is fed through the retorts or troughs in progressively decreasing quantities from the top to the bottom thereof and this supply of fuel is in inverse proportion to the thickness of the bed effected by said settling movement. Therefore the resultant of the progressively decreasing feed of the fuel from top to bottom of each retort and the agitation of the entire fuel bed is to obtain a fuel bed of substantially uniform thickness, whence arises a proper distribution of fuel and air and a substantially uniform combustion. This continous agitation has the further advantage of breaking up the fuel bed and preventing the formation of large lumps of coke or clinker. Also, as the fuel bed is maintained at an inclination less than the normal angle of repose of the fuel, any sudden rush of fuel and solid products of combustion down the slope is effectively prevented.

Air is supplied the twyers in any suitable way, as through an air box 16 communicating with a pipe 17 which may lead from any suitable blower or other air supplying devices.

At the rear of the series of twyers and fuel retorts or troughs is a receiving grate, shown as composed of a plurality of movable bars 18 of any suitable construction, the same preferably having movement in the same plane and transversely to said twyers and retorts, and desirably alternate bars move in opposite directions. Said grate bars 18 may be actuated in any suitable way, as by cams 19 rotated by a shaft 20 driven through beveled gears 21 and belt or chain drive 22 from the main shaft 23. Said grate bars 18 preferably have an air supply which is decreased progressively from front to rear in any suitable way, as diagrammatically illustrated by the size of the air passages 24 in said bars. In the rear bar or bars this air supply may be replaced by a steam or other wet fluid injection, so that the moisture when coming in contact with the heated clinkers will form combustible gases while, at the same time, cooling the solid products of combustion.

In the rear of the grate afforded by said bars 18 is a fixed or tiltable dumping plate 25 for discharging the solid products of combustion into the ash pit 26.

The shaft 7 may be rotated from shaft 23 in any suitable way, as through the belt or chain drive 27 and speed-reducing mechanism of any suitable construction in the housing 28.

Figure 2:
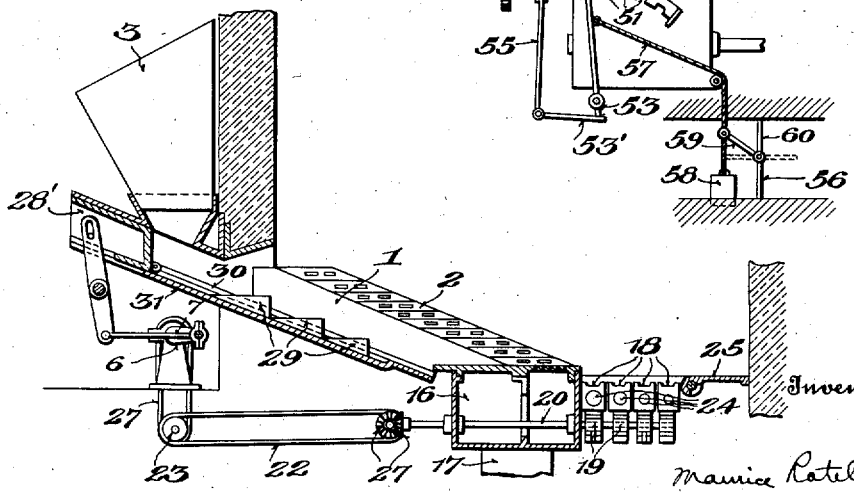
Fig. 2 is a longitudinal section through another automatic underfeed stoker embodying the present invention.

In the form shown in Fig. 2, the fuel-feeding mechanism takes the form of a main fuel-feeding member or ram 28′ and a plurality of secondary, wedge-shaped fuel-feeding members 29 of progressively decreasing size and mounted on a connecting rod 30 operatively connected to the main fuel-feeding member 28′. Said fuel-feeding members 28 and 29 have a reciprocating movement parallel to the bottom 31 of the retort 1, but each of the fuel-feeding members has a substantially vertical fuel-pushing face and each of the secondary fuel-feeding members has a substantially horizontal fuel-supporting face, as do the fuel-feeding members in the embodiment of Fig. 1. It will therefore be perceived that said fuel-feeding members in the embodiment of Fig. 2 are of progressively decreasing capacity and disposed substantially throughout the length of each retort, whereby, as in the embodiment of Fig. 1, they feed the fuel by substantially parallel motion and in horizontal directions to the successive portions of the fuel bed and, by keeping the entire fuel bed in agitation and by feeding progressively smaller quantities of fuel from the top to the bottom of each retort maintain a fuel bed of substantially uniform thickness. Otherwise, the construction of the stoker in the embodiment of Fig. 2 is, or may be, substantially the same as that shown in Fig. 1.

In conformity with this invention the fuel being fed through the bottom of the retorts or troughs is supplied with sufficient air to insure its ignition. To this end the bottom plate 34 at the rear of each retort is preferably provided with one or more apertures 35 for the passage of air to the fuel, and each of the twyers may also be provided with an extension plate 36 at its rear in which are provided one or more apertures 37 for the passage of air. Instead of using apertures in the plates 34 and 36, however, suitable grate bars may be employed at the rear portions of the fuel retorts and the extensions of the twyers. This auxiliary supply of air at the rear of the fuel retorts and twyers insures that the fuel fed along the bottom of each retort shall have sufficient air to become properly ignited and therefore avoids incomplete combustion. This auxiliary supply of air also has the additional advantage that the portions of the stoker adjacent thereto are cooled and their early destruction by overheating prevented.

In conformity with this invention the twyers are preferably so constructed that their surfaces are maintained relatively cool. To this end they may be provided interiorly with partitions 38 for directing the incoming air into cooling contact with their upper or fuel-supporting surfaces 39 before it escapes through the lateral apertures 40, as shown in Figure 4, or in addition they may have corrugated walls 41 to increase their cooling surface, as shown in Fig. 5. The provision of corrugations also has the additional advantage that the twyers are formed with external recesses 42 in which the ashes may collect and form a protective layer.

The twyers may also be provided with apertures 43 in their upper or fuel-supporting faces, as well as with the lateral apertures 40, as shown in Figs. 8 to 10, so that the entire surface of the twyers may be cooled by the passage of air therethrough. This construction has the further advantage that the fuel-supporting surface of each twyer also functions as a grate so as to considerably increase the combustion rate without increasing the air pressure, or to maintain the same combustion rate with a smaller air pressure or even enabling the stoker to work with natural draft. Said twyers may be either of unitary construction as shown in Figs. 6, 7 and 8, or they may be built up of a plurality of separate bars 44 as shown in Figs. 9 and 10, in which event the separate bars may be held together in any suitable way.

It is to be expressly understood that the grate bars may be of any suitable cross section, as round, triangular, etc., and the apertures therein may be of any suitable shape and of the same or varying section. Furthermore, any and all of these provisions for cooling the twyers may be combined with means for cooling the same through the use of a steam jet, humid air, water spray, circulation of water, etc.

Any suitable means may be provided for supplying air, driving the stoker and varying the speed of said mechanism. When a steam engine or direct current motor is employed the speed may be varied automatically or otherwise in any suitable way, as by automatically-controlled valves or an automatically-controlled rheostat. When an alternating current is used and especially when a three-phase current is employed, so that only slight variations of speed may be obtained by variations of the current, change-speed devices of any suitable construction may be applied to the air-supplying mechanism and the stokers and also individually to each stoker to secure a proper regulation of the speed. A change-speed box for application to each individual stoker is shown diagrammatically in Fig. 11, wherein 45 is the change-speed box, 46 a gear driven in any suitable way from the main shaft 23, and 47 a clutch of any suitable construction for connecting the gear 46 with the driving shaft of the change-speed mechanism in the box 45, said clutch being normally pressed into operative position by the spring 54. The change-speed mechanism is shown as controlled by a lever 49 having a handle 50 which controls a catch for engagement with the teeth 51 of the sector plate 52. Said lever 49 may have an extension 53 for engagement with the arm 53′ of the bell crank 55, which in turn controls the movement of the clutch 47 into and out of operative position.

It is also desirable that the mechanism for changing the speed of the stoker be connected to the means for controlling the supply of air to the furnace, so as to maintain a constant relation between the quantity of fuel and the quantity of air admitted thereto. This is accomplished in the structure diagrammatically illustrated in Fig. 11 by the connection of the damper 56 in the air-supplying conduit with the lever 49 of the speed-regulating device by a cable 57, a counter-weight 58 being shown as connected to the arm 59 of the damper 56 to facilitate adjustment of the latter.

It is to be expressly understood that the term "capacity" as employed in the claims with reference to the fuel feeding members is to be construed as generic to fuel feeding members of successively decreasing feeding capacity whether effected by progressive decrease in size, stroke, or otherwise. While the constructions shown on the drawings have been described with considerable particularity it is to be expressly understood that the invention is not limited thereto, as the same is capable of being embodied in a variety of forms. In place of the crank mechanism shown for driving the fuel-feeding members any other suitable devices may be employed. The number, size, form, and inclination of the twyers and fuel retorts or troughs may also be varied in conformity with the fuel to be employed. Certain features of the invention may be employed without other features thereof, and changes may be made in details of construction, proportion and arrangement of parts without departing from the spirit of this invention. Reference is therefore to be had to the claims hereto appended for a definition of said invention.

This application is for the reissue of my Patent No. 1,389,982, granted as a division on my application Serial No. 828,423, filed March 30, 1914, which has matured into Patent No. 1,366,098, dated Jan. 18, 1921, and which in turn is a division of my application Sr. No. 757,353, filed Mar. 28, 1913.

What is claimed is:

1. In an automatic underfeed stoker, a series of alternating twyers and fuel retorts or troughs providing an inclined fuel bed whereby the fuel and solid products of combustion are fed downwardly with the aid of gravity, and means for feeding fuel through said retorts to said fuel bed comprising a main fuel-feeding member and a plurality of secondary fuel-feeding members disposed substantially throughout the length of each retort, the successive members in each retort having progressively decreasing capacity in the direction of inclination of the fuel bed and substantially parallel movement to feed progressively smaller quantities of fuel to the fuel bed in substantially parallel directions.

2. In an automatic underfeed stoker, a series of alternating twyers and fuel retorts or troughs providing an inclined fuel bed whereby the fuel and solid products of combustion are fed downwardly with the aid of gravity, and means for feeding fuel through said retorts to said fuel bed comprising a main fuel-feeding member and a plurality of secondary fuel-feeding members disposed substantially throughout the length of each retort, the successive members in each retort having progressively decreasing capacity in the direction of inclination of the fuel bed and substantially simultaneous and parallel movement in the same direction to feed progressively smaller quantities of fuel to the fuel bed.

3. In an automatic underfeed stoker, a series of alternating twyers and fuel retorts or troughs providing an inclined fuel bed whereby the fuel and solid products of combustion are fed downwardly with the aid of gravity, and means for feeding quantities of fuel through said retorts to said fuel bed in substantially parallel directions and comprising a main fuel-feeding member and a plurality of secondary fuel-feeding and fuel supporting members disposed substantially throughout the length of each retort, the members in each retort having substantially parallel reciprocating motion and being of progressively decreasing capacity from the top to the bottom of the retort.

4. In an automatic underfeed stoker, a series of alternating fuel retorts or troughs and downwardly-inclined twyers, and means for feeding fuel through said retorts comprising a main fuel-feeding member at the upper end of each retort and a plurality of secondary fuel-feeding members disposed throughout the major portion of the length of each retort and having progressively decreasing capacity, said fuel feeding members in each retort having substantially parallel movement in the same direction to feed progressively smaller quantities to the fuel bed.

5. In an automatic underfeed stoker, a series of alternating fuel retorts or troughs and downwardly-inclined twyers, and means for feeding fuel through said retorts comprising a main fuel-feeding member at the upper end of each retort and a plurality of secondary fuel-feeding members disposed throughout the major portion of the length of each retort and having progressively decreasing capacity, said fuel-feeding members in each retort constituting supports for the fuel and having substantially parallel movement in the same direction to feed progressively smaller quantities to the fuel bed.

6. In an automatic underfeed stoker, a series of alternating fuel retorts or troughs and downwardly-inclined twyers providing a downwardly inclined fuel bed, and means for feeding quantities of fuel in substantially parallel directions through said retorts to said fuel bed and comprising a main fuel-feeding member at the upper end of each retort and a plurality of secondary fuel-feeding members disposed throughout the major portion of the length of each retort, the members in each retort having substantially parallel motion of progressively decreasing stroke.

7. In an automatic underfeed stoker, a series of alternating fuel retorts or troughs and downwardly-inclined twyers providing a downwardly inclined fuel bed, and means for feeding quantities of fuel in substantially parallel directions through said retorts to said fuel bed and comprising a main fuel-feeding member at the upper end of each retort and a plurality of secondary fuel-feeding members disposed throughout the major portion of the length of each retort, the members in each retort being of progressively-decreasing capacity and having substantially parallel motion.

8. In an automatic underfeed stoker, a series of alternating fuel retorts or troughs and downwardly-inclined twyers, and means for feeding fuel through each of said retorts comprising a main fuel-feeding member, a rod operatively connected to said main fuel-feeding member and pivotally mounted at its opposite end, and a plurality of secondary fuel-feeding members operatively connected to said rod and moved progressively-decreasing amounts.

9. In an automatic underfeed stoker, a series of alternating fuel retorts or troughs and downwardly-inclined twyers providing a downwardly inclined fuel bed, and means for feeding quantities of fuel in substantially parallel directions through each of said retorts to said fuel bed and comprising a main fuel-feeding member and a pluralitv of secondary fuel-feeding members operatively connectd to said main fuel-feeding member and having substantially horizontal upper faces and substantially vertical fuel-pushing faces, said members having progressively decreased capacity to feed progressively smaller quantities of fuel to the fuel bed.

10. In an automatic underfeed stoker, a series of alternating fuel retorts or troughs and twyers providing an inclined fuel bed whereby the fuel and solid products of combustion are fed downwardly with the aid of gravity, and means for feeding fuel through said retorts to said fuel bed comprising a main fuel-feeding member and a plurality of secondary fuel-feeding members disposed throughout a major portion of the length of each retort, said fuel feeding members in each retort having progressively decreasing capacity and substantially parallel and simultaneous feeding motion in the same direction.

11. In an automatic underfeed stoker, a series of alternating fuel retorts or troughs and twyers providing an inclined fuel bed whereby the fuel and solid products of combustion are fed downwardly with the aid of gravity, and means for feeding fuel through said retorts to said fuel bed comprising a main fuel-feeding member and a pluarilty of secondary fuel-feeding members disposed substantially throughout the length of each retort, said members having progressively decreasing capacity and successively adapted to feed progressively smaller quantities of fuel to the fuel bed in substantially parallel directions.

12. In an automatic underfeed stoker, a series of alternating fuel retorts or troughs and downwardly-inclined twyers providing an inclined fuel bed whereby the fuel and solid products of combustion are fed downwardly with the aid of gravity, and a plurality of fuel-feeding members in each of said retorts disposed substantially throughout the length of each retort, said members having progressively decreasing capacity and respectively adapted to feed the fuel toward successive portions of said fuel bed in substantially parallel directions.

13. In an automatic underfeed stoker, a series of alternating fuel retorts or troughs and downwardly-inclined twyers providing an inclined fuel bed whereby the fuel and solid products of combustion are fed downwardly with the aid of gravity, and a plurality of fuel-feeding members in each of said retorts adapted to feed the fuel in substantially parallel directions toward successive portions of said fuel bed and agitate the same to aid gravity in the movement of the fuel and solid products of combustion down the incline of said bed, said fuel-feeding members having progressively decreasing capacity to feed fuel to said bed in inverse proportion to the thickness of the bed arising from gravitational movement of the fuel and solid products of combustion.

14. In an automatic underfeed stoker, a series of alternating fuel retorts or troughs and downwardly-inclined twyers providing an inclined fuel bed whereby the fuel and solid products of combustion are fed downwardly with the aid of gravity, and a plurality of fuel-feeding members in each of said retorts disposed throughout the major portion of the length of each retort and adapted to agitate substantially the entire fuel bed to aid gravity in the downward movement of the fuel and solid products of combustion, said fuel-feeding members having progressively decreasing capacity to supply fuel in substantially parallel directions to said bed in inverse proportion to the thickness of said bed arising from gravitational movement of the fuel and solid products of combustion.

15. In an automatic underfeed stoker, a series of alternating twyers and fuel retorts or troughs providing an inclined fuel bed whereby the fuel and solid products of combustion are fed downwardly with the aid of gravity, and means for feeding quantities of fuel in substantially parallel directions through said retorts to said fuel bed and comprising a plurality of fuel-feeding members having progressively decreasing capacity in each of said retorts and successively adapted to feed progressively smaller quantities of fuel to the fuel bed, the rear end of each of said retorts being provided in its bottom with apertures for the passage of air.

16. In an automatic underfeed stoker, a series of alternating twyers and fuel retorts or troughs providing an inclined fuel bed whereby the fuel and solid products of combustion are fed downwardly with the aid of gravity, each of said twyers having an extension at its rear end provided with an aperture for the passage of air, and means for feeding fuel through said retorts comprising a plurality of fuel-feeding members in each of said retorts, said members having progressively decreasing capacity and successively adapted to feed progressively smaller quantities of fuel to the fuel bed in substantially parallel directions.

17. In an automatic underfeed stoker, a plurality of alternating twyers and fuel retorts or troughs, means for feeding fuel through said retorts comprising a plurality of fuel-feeding members successively adapted to feed progressively smaller quantities of fuel to the fuel bed, and a grate at the rear of said retorts and twyers provided with an air supply decreasing progressively in the direction of the travel of the fuel.

18. In an automatic underfeed stoker, a plurality of alternating twyers and fuel retorts or troughs, means for feeding fuel through said retorts comprising a plurality of fuel-feeding members successively adapted to feed progressively smaller quantities of fuel to the fuel bed, a plurality of movable grate bars at the rear of said retorts and twyers, and means at the rear of said grate bars for dumping the solid products of combustion.

19. In an automatic underfeed stoker, a plurality of alternating twyers and fuel retorts or troughs, means for feeding fuel through said retorts comprising a plurality of fuel feeding members successively adapted to feed progressively smaller quantities of fuel to the fuel bed, and a plurality of reciprocating grate bars at the rear of said retorts and twyers and movable transversely of the same.

20. In an automatic underfeed stoker, a plurality of alternating twyers and fuel retorts or troughs, means for feeding fuel through said retorts comprising a plurality of fuel-feeding members successively adapted to feed progressively smaller quantities of fuel to the fuel bed, and a plurality of reciprocating grate bars at the rear of said retorts and twyers, alternate grate bars having movement in reverse directions.

21. In an automatic underfeed stoker, a plurality of alternating twyers and fuel retorts or troughs, means for feeding fuel through said retorts comprising a plurality of fuel-feeding members successively adapted to feed progressively smaller quantities of fuel to the fuel bed, and a plurality of reciprocating grate bars at the rear of said retorts and twyers provided with an air supply decreasing progressively in the direction of the feed of the fuel, alternate grate bars having movement in reverse directions.

22. In an automatic underfeed stoker, a plurality of alternating twyers and fuel retorts or troughs providing an inclined fuel bed whereby the fuel and solid products of combustion are fed downwardly with the aid of gravity, said twyers having internal air-directing walls for directing air into cooling contact with the heated surface of the twyers, and means for feeding fuel through said retorts comprising a plurality of fuel-feeding members in each of said retorts, said members having progressively decreasing capacity and successively adapted to feed progressively smaller quantities of fuel to the fuel bed in substantially parallel directions.

23. In an automatic underfeed stoker, a plurality of alternating twyers and fuel retorts or troughs providing an inclined fuel bed whereby the fuel and solid products of combustion are fed downwardly with the aid of gravity, said twyers having corrugated walls and providing external ash-collecting recesses, and means for feeding fuel through said retorts comprising a plurality of fuel-feeding members in each of said retorts successively adapted to feed progressively smaller quantities of fuel to the fuel bed in substantially parallel directions.

24. In an automatic underfeed stoker, a plurality of alternating twyers and fuel retorts or troughs providing an inclined fuel bed whereby the fuel and solid products of combustion are fed downwardly with the aid of gravity, said twyers being provided with apertures for the passage of air in both their upper and lateral faces, and means for feeding fuel through said retorts comprising a plurality of fuel-feeding members in each of said retorts, said members having progressively decreasing capacity and successively adapted to feed progressively smaller quantities of fuel to the fuel bed in substantially parallel directions.

25. In an automatic underfeed stoker, a plurality of alternating twyers and fuel retorts or troughs providing an inclined fuel bed whereby the fuel and solid products of combustion are fed downwardly with the aid of gravity, said twyers being constructed to be cooled by fluid circulation, and means for feeding fuel through said retorts comprising a plurality of fuel-feeding members in each of said retorts, said members having progressively decreasing capacity and successively adapted to feed progressively smaller quantities of fuel to the fuel bed in substantially parallel directions.

26. In an automatic underfeed stoker, a plurality of alternating twyers and fuel retorts or troughs providing an inclined fuel bed whereby the fuel and solid products of combustion are fed downwardly with the aid of gravity, said twyers being each composed of a plurality of bars operatively related and constructed to be cooled by the flow of air therethrough, and means for feeding fuel through said retorts comprising a plurality of fuel-feeding members in each of said retorts, said members having progressively decreasing capacity and successively adapted to feed progressively smaller quantities of fuel to the fuel bed in substantially parallel directions.

27. In an automatic underfeed stoker, a series of alternating twyers and fuel retorts or troughs, means for feeding fuel through said retorts comprising a plurality of fuel-feeding members in each of said retorts, said members having progressively decreasing capacity and successively adapted to feed progressively smaller quantities of fuel to the fuel bed, means for regulating the supply of air, means for regulating the speed of said stoker, and operative connections between said last-named means whereby the supply of fuel and air may be carried simultaneously.

28. In an automatic underfeed stoker, a series of alternating fuel retorts or troughs and downwardly inclined twyers providing an inclined fuel bed whereby the fuel and solid products of combustion are fed downwardly with the aid of gravity, and means disposed throughout the major portion of the length of said retorts for feeding fuel through the same to said fuel bed, said means comprising a plurality of fuel-feeding members in each retort constituting substantially horizontal fuel supports.

29. In an automatic underfeed stoker, a series of alternating twyers and fuel retorts or troughs providing an inclined fuel bed whereby the fuel and solid products of combustion are fed downwardly with the aid of gravity, means for feeding fresh fuel in a substantially horizontal direction through said retorts to said fuel bed and comprising a plurality of fuel-feeding members in each of said retorts, and plates disposed between said twyers and forming with the latter extensions of said retorts, said plates being provided with apertures for the passage of air.

30. In an automatic underfeed stoker, a series of alternating fuel retorts or troughs and downwardly inclined twyers providing an inclined fuel bed whereby the fuel and solid products of combustion are fed downwardly with the aid of gravity, a stationary apertured plate extending from the lower end of each twyer, and means for feeding fresh fuel through said retorts to said fuel bed comprising a plurality of fuel feeding members disposed substantially throughout the length of each retort and having substantially horizontal fuel supporting surfaces.

31. In an automatic underfeed stoker, a plurality of alternating twyers and fuel retorts or troughs, means for feeding fuel through said retorts comprising a plurality of fuel-feeding members successively adapted to feed fresh fuel to the fuel bed, and a grate at the rear of said retorts and twyers provided with an air supply decreasing progressively in the direction of travel of the fuel.

32. In an automatic underfeed stoker, a plurality of alternating twyers and fuel retorts or troughs, means for feeding fuel through said retorts to the fuel bed comprising a plurality of fuel-feeding members, a plurality of grate bars at the rear of said retorts and twyers and movable transversely of the same, and means at the rear of said grate bars for dumping the solid products of combustion.

33. In an automatic stoker, a plurality of alternating twyers and fuel retorts or troughs, means for feeding fuel through said retorts to the fuel bed comprising a plurality of fuel-feeding members, and a plurality of reciprocating grate bars at the rear of said retorts and twyers and movable transversely of the same.

34. In an automatic underfeed stoker, a plurality of alternating twyers and fuel retorts or troughs, means for feeding fuel through said retorts to the fuel bed comprising a plurality of fuel-feeding members, and a plurality of reciprocating grate bars at the rear of said retorts and twyers, alternate grate bars having movement in reverse directions.

35. In an automatic stoker, a plurality of alternating twyers and fuel retorts or troughs, means for feeding fuel through said retorts to the fuel bed comprising a plurality of fuel-feeding members, and a plurality of reciprocating grate bars at the rear of said retorts and twyers provided with an air supply decreasing progressively in the direction of the feed of the fuel, alternate grate bars having movement in reverse directions.

36. In an automatic underfeed stoker, a plurality of alternating twyers and fuel retorts or troughs providing an inclined fuel bed whereby the fuel and solid products of combustion are fed downwardly with the aid of gravity, said twyers having corrugated walls and providing external ash-collecting recesses, and means for feeding fuel through said retorts comprising a plurality of fuel-feeding members in each of said retorts adapted to feed the fresh fuel to the fuel bed in a substantially horizontal direction.

37. In an automatic underfeed stoker, a series of alternating twyers and fuel retorts or troughs providing an inclined fuel bed whereby the fuel and solid products of combustion are fed downwardly with the aid of gravity, and means for feeding fuel through said retorts to said inclined fuel bed in a substantially horizontal direction, said means comprising a main fuel feeding member and a plurality of secondary fuel feeding members disposed substantially throughout the length of each retort, said secondary fuel feeding members having substantially horizontal fuel supporting surfaces and substantially vertical fuel pushing faces.

38. In an automatic underfeed stoker, a series of alternating twyers and fuel retorts or troughs providing an inclined fuel bed whereby the fuel and solid products of combustion are fed downwardly with the aid of gravity, and means for feeding fresh fuel through said retorts to said inclined fuel bed in substantially horizontal and parallel directions, said means comprising a plurality of fuel feeding members in each retort disposed throughout a major portion of the length thereof and having substantially horizontal fuel supporting surfaces and substantially vertical fuel pushing faces.

39. In an automatic underfeed stoker, a plurality of alternating twyers and retorts providing an inclined fuel bed down which the fuel and solid products of combustion move with the aid of gravity, and means for feeding fuel through said retorts to said inclined fuel bed comprising main and secondary fuel feeding members disposed substantially throughout the length of each retort and having reciprocating motion, said secondary fuel feeding members having substantially horizontal fuel supporting surfaces and substantially vertical fuel pushing faces whereby fresh fuel is fed to said inclined fuel bed in substantially horizontal and parallel directions.

40. In an automatic underfeed stoker, a series of alternating twyers and retorts or troughs providing a downwardly inclined fuel bed, and means for feeding fresh fuel in a substantially horizontal direction through said retorts to said fuel bed, said means comprising a main fuel feeding member and a plurality of secondary fuel feeding members disposed throughout a major portion of the length of each retort and operatively connected to said main fuel feeding member, said secondary fuel feeding members having substantially horizontal fuel supporting surfaces and substantially vertical fuel pushing faces.

41. In a gravity underfeed stoker, a plurality of alternating twyers and retorts or troughs providing an inclined fuel bed, and automatic means for feeding fuel through said retorts to said fuel bed comprising a plurality of reciprocating fuel feeding members disposed longitudinally throughout the major portion of the length of each retort and having substantially horizontal fuel supporting surfaces and substantially vertical fuel pushing faces whereby fresh fuel is fed to said inclined fuel bed in a substantially horizontal direction.

42. In a gravity underfeed stoker, a plurality of alternating twyers and retorts or troughs providing an inclined fuel bed, and automatic means for feeding fuel through said retorts to said fuel bed comprising a plurality of fuel feeding members disposed longitudinally throughout the major portion of the length of each retort and having reciprocating motion, said members being provided with substantially horizontal fuel supporting faces and substantially vertical fuel pushing faces.

43. In an automatic underfeed stoker, a plurality of alternating twyers and retorts providing an inclined fuel bed, and means for feeding fuel through said retorts to said fuel bed in a substantially horizontal direction comprising a plurality of fuel feeding members disposed throughout the major portion of the length of each retort, said fuel feeding members having successively stepped relation and substantially horizontal fuel supporting surfaces.

44. In an automatic underfeed stoker, a plurality of alternating twyers and retorts providing an inclined fuel bed, and means in each retort for feeding fresh fuel through said retorts to said fuel bed in a substantially horizontal direction, said fuel feeding means extending throughout the major portion of the length of each retort and having stepped formation and providing a plurality of horizontal fuel supporting surfaces.

45. In a gravity underfeed stoker, a series of alternating twyers and retorts providing an inclined fuel bed, and a plurality of fuel feeding members in each of said retorts disposed throughout the major portion of the length of each retort and adapted to agitate substantially the entire fuel bed to aid gravity in the downward movement of the fuel and solid products of combustion, said fuel feeding members having successively stepped relation to provide substantially horizontal fuel supporting surfaces and substantially vertical fuel pushing faces whereby fresh fuel is fed to said inclined fuel bed in substantially parallel and horizontal directions.

46. In an automatic underfeed stoker, a series of alternating fuel retorts or troughs and downwardly inclined twyers providing an inclined fuel bed, and means for feeding fresh fuel through said retorts to said fuel bed, said means comprising a plurality of fuel feeding members in each retort extending throughout a major portion of the length thereof and arranged to operate in the fresh fuel therein, said fuel feeding members having successively stepped relation and substantially horizontal fuel supporting surfaces.

47. In an automatic underfeed stoker, a series of alternating twyers and fuel retorts or troughs providing an inclined fuel bed, means supplying fuel to said fuel bed, and plates disposed between said twyers and forming with the latter extensions of said retorts, said plates being provided with apertures for the passage of air.

48. In an automatic underfeed stoker, a series of twyers and retorts providing an inclined fuel bed, means for feeding fresh fuel through said retorts to said fuel bed, and plates disposed between said twyers and forming with the latter extensions of said retorts, said plates being provided with apertures for the passage of air.

49. In an automatic underfeed stoker, a series of alternating twyers and retorts providing an inclined fuel bed, means for feeding fuel through said retorts to said fuel bed comprising main and secondary fuel feeding members disposed substantially throughout the length of each retort, and plates disposed between said twyers and forming with the latter extensions of said retorts, said plates being provided with apertures for the passage of air.

50. In an automatic underfeed stoker, a series of alternating twyers and fuel retorts or troughs providing an inclined fuel bed, means supplying fuel to said fuel bed, plates disposed between said twyers and forming with the latter extensions of said retorts, said plates being provided with apertures for the passage of air, and plates at the bottom of said twyers provided with an air supply.

51. In an automatic underfeed stoker, an underfeed portion and an overfeed portion, said underfeed portion comprising a series of alternating fuel retorts or troughs and downwardly inclined twyers and said overfeed portion comprising stationary apertured plates disposed between the lower ends of said twyers and stationary apertured plates extending rearwardly from the latter, and means for feeding fuel to said overfeed and underfeed portions.

52. In a gravity underfeed stoker, a series of alternating twyers and retorts providing an inclined fuel bed, a plurality of reciprocating fuel feeding devices in said retorts arranged to operate in the fresh fuel therein, and plates disposed between said twyers and forming with the latter extensions of said retorts, said plates being provided with apertures for the passage of air.

53. In an automatic underfeed stoker, a series of alternating twyers and fuel retorts or troughs providing a fuel bed, means for feeding fuel through said retorts, and a grate at the end of said fuel bed provided with a progressively decreasing air supply.

54. In an automatic underfeed stoker, a series of alternating twyers and retorts providing an inclined fuel bed, means for feeding fuel through said retorts to said fuel bed, plates at the bottom of the fuel bed provided with apertures for the passage of air, and grates receiving the fuel and solid products of combustion from the fuel bed and having a progressively decreasing air supply.

55. In an automatic underfeed stoker, a series of alternating twyers and retorts providing an inclined fuel bed, said twyers supplying air to said fuel bed, and grates at the bottom of said fuel bed and having a progressively decreasing air supply.

56. In a gravity-underfeed stoker, the combination of a series of retorts, and corrugated twyers alternating therewith.

57. In a gravity-underfeed stoker, the combination of a series of retorts, and twyers alternating therewith, said twyers being composed of a series of corrugated sections.

58. In a gravity-underfeed stoker, the combination of a series of retorts, and a series of corrugated twyers provided with openings for admitting a combustion-supporting fluid through the walls thereof.

59. In a gravity underfeed stoker, a series of alternating retorts and sectional twyers, the sections of said twyers having corrugated walls provided with openings for a combustion supporting fluid.

60. In a gravity underfeed stoker, the combination of a series of alternating retorts and corrugated twyers free from horizontal surfaces.

61. In an automatic underfeed stoker, a plurality of alternating twyers and retorts providing an inclined fuel bed whereby the fuel and solid products of combustion are fed downwardly with the aid of gravity, means for feeding fuel through said retorts to said fuel bed, and means providing a progressively decreasing air supply for the fuel in its direction of travel.

In testimony whereof I have signed this specification.

MAURICE RATEL.